United States Patent
Liu et al.

(10) Patent No.: US 10,917,425 B2
(45) Date of Patent: Feb. 9, 2021

(54) GRAPH STRUCTURE MODEL TRAINING AND JUNK ACCOUNT IDENTIFICATION

(71) Applicant: Advanced New Technologies Co., Ltd., Grand Cayman (KY)

(72) Inventors: Ziqi Liu, Zhejiang (CN); Chaochao Chen, Zhejiang (CN); Jun Zhou, Zhejiang (CN); Xiaolong Li, Zhejiang (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/882,084

(22) Filed: May 22, 2020

(65) Prior Publication Data

US 2020/0287926 A1  Sep. 10, 2020

Related U.S. Application Data (63) Continuation of application No. PCT/CN2019/071868, filed on Jan. 16, 2019.

(30) Foreign Application Priority Data

Mar. 14, 2018  (CN) .......................... 2018 1 0209270

(51) Int. Cl.
*H04L 29/06* (2006.01)
*G06N 20/00* (2019.01)
(Continued)

(52) U.S. Cl.
CPC ...... *H04L 63/1425* (2013.01); *G06F 16/9024* (2019.01); *G06F 21/552* (2013.01);
(Continued)

(58) Field of Classification Search
CPC ............. H04L 63/1408; H04L 63/1416; H04L 63/1425; H04L 63/1483; G06F 21/552; G06F 21/554
See application file for complete search history.

(56) References Cited

U.S. PATENT DOCUMENTS 6,411,701 B1     6/2002  Stademann
10,009,358 B1 *  6/2018  Xie ........................ G06F 21/316
(Continued)

FOREIGN PATENT DOCUMENTS

CN    102946331 A    2/2013
CN    104318268 A    1/2015
(Continued)

*Primary Examiner* — Jeremy S Duffield
(74) *Attorney, Agent, or Firm* — Seed IP Law Group LLP (57) ABSTRACT

Implementations of the present specification disclose graph structure model training and junk account identification methods, apparatuses, and devices. The solution includes: obtaining an account medium network graph, a node in the account medium network graph representing an account and a medium, and at least some edges indicating that a login behavior relationship exists between nodes connected by the edges; obtaining feature data and risk labeling data of the node, the feature data reflecting a login behavior of the corresponding node in a time sequence; and training, based on the account medium network graph, the feature data, and the risk labeling data, a predefined graph structure model for identifying a junk account.

24 Claims, 4 Drawing Sheets

(51) Int. Cl.
*G06F 16/901* (2019.01)
*G06F 21/55* (2013.01)
*G06N 5/04* (2006.01)

(52) U.S. Cl.
CPC .......... *G06F 21/554* (2013.01); *G06N 5/04* (2013.01); *G06N 20/00* (2019.01); *H04L 63/1416* (2013.01); *H04L 63/1483* (2013.01)

(56) References Cited

U.S. PATENT DOCUMENTS

| | | | |
|---|---|---|---|
| 2014/0122294 A1 | 5/2014 | Chen et al. | |
| 2015/0339477 A1 | 11/2015 | Abrams et al. | |
| 2017/0372318 A1* | 12/2017 | Shami | H04L 63/1408 |
| 2018/0367548 A1* | 12/2018 | Stokes, III | H04L 63/145 |

FOREIGN PATENT DOCUMENTS

| | | |
|---|---|---|
| CN | 104615658 A | 5/2015 |
| CN | 105279086 A | 1/2016 |
| CN | 106355405 A | 1/2017 |
| CN | 106503562 A | 3/2017 |
| CN | 106803178 A | 6/2017 |
| CN | 107066616 A | 8/2017 |
| CN | 107153847 A | 9/2017 |
| CN | 107633263 A | 1/2018 |

\* cited by examiner

GRAPH STRUCTURE MODEL TRAINING AND JUNK ACCOUNT IDENTIFICATION

CROSS-REFERENCE TO RELATED APPLICATIONS

This patent application is a continuation of and claims priority to PCT Application No. PCT/CN2019/071868, filed on Jan. 16, 2019, which claims priority to Chinese Patent Application No. 201810209270.1, filed on Mar. 14, 2018 and entitled "GRAPH STRUCTURE MODEL TRAINING AND JUNK ACCOUNT IDENTIFICATION METHOD, APPARATUS, AND DEVICE", which are incorporated herein by reference in their entirety.

BACKGROUND

Technical Field

The present specification relates to the technical field of computer software, and in particular, to graph structure model training and junk account identification methods, apparatuses, and devices.

Description of the Related Art

With the rapid development of computer and Internet technologies, many services can be carried out on the Internet. To use these services, users often need to register corresponding accounts, such as e-commerce platform accounts, third-party payment platform accounts, forum platform accounts, etc.

Some users or organizations register a large quantity of accounts for undesirable purposes and use these accounts to perform abnormal operations, such as messaging, publishing false advertisements, brushing, etc. Such accounts can pose risks to the platform and are of low value to the platform and are considered junk accounts.

In the existing technology, a junk account is generally determined and dealt with correspondingly, such as freezing and canceling, after being reported by a user.

Based on the existing technology, a more reliable solution for identifying a junk account is needed.

BRIEF SUMMARY

Implementations of the present specification provide graph structure model training and junk account identification methods, apparatuses, and devices, to provide a more reliable solution for identifying a junk account.

To resolve the previously technical problem, the implementations of the present specification provide the following solutions.

An implementation of the present specification provides a graph structure model training method, including: obtaining an account medium network graph, a node in the account medium network graph representing an account and a medium, and at least some edges indicating that a login behavior relationship exists between nodes connected by the edges; obtaining feature data and risk labeling data of the node, the feature data reflecting a login behavior of the corresponding node in a time sequence; and training, based on the account medium network graph, the feature data, and the risk labeling data, a predefined graph structure model for identifying a junk account.

An implementation of the present specification provides a junk account identification method, including: obtaining feature data of a to-be-identified account, and obtaining an account medium network graph that contains the to-be-identified account; inputting the feature data of the to-be-identified account and a topology corresponding to the to-be-identified account in the account medium network graph, into a graph structure model for calculation, the graph structure model being trained using the above graph structure model training method; and determining whether the to-be-identified account is a junk account based on prediction data output by the trained graph structure model.

An implementation of the present specification provides a graph structure model training apparatus, including: a first acquisition module, configured to obtain an account medium network graph, a node in the account medium network graph representing an account and a medium, and at least some edges indicating that a login behavior relationship exists between nodes connected by the edges; a second acquisition module, configured to obtain feature data and risk labeling data of the node, the feature data reflecting a login behavior of the corresponding node in a time sequence; and a training and identification module, configured to train, based on the account medium network graph, the feature data, and the risk labeling data, a predefined graph structure model for identifying a junk account.

An implementation of the present specification provides a junk account identification apparatus, including: an acquisition module, configured to obtain feature data of a to-be-identified account, and obtain an account medium network graph that contains the to-be-identified account; an input module, configured to input the feature data of the to-be-identified account and a topology corresponding to the to-be-identified account in the account medium network graph, into a graph structure model for calculation, the graph structure model being trained using the above graph structure model training method; and a determining module, configured to determine whether the to-be-identified account is a junk account based on prediction data output by the trained graph structure model.

An implementation of the present specification provides a graph structure model training device, including at least one processor, and a memory communicatively connected to the at least one processor. The memory stores instructions that can be executed by the at least one processor, and the instructions are executed by the at least one processor to enable the at least one processor to: obtain an account medium network graph, a node in the account medium network graph representing an account and a medium, and at leak some edges indicating that a login behavior relationship exists between nodes connected by the edges; obtain feature data and risk labeling data of the node, the feature data reflecting a login behavior of the corresponding node in a time sequence; and train, based on the account medium network graph, the feature data, and the risk labeling data, a predefined graph structure model for identifying a junk account.

The above at least one technical solution adopted in the implementations of the present specification can achieve the following beneficial effects: a junk account can be effectively identified based on the media aggregation and time aggregation of the junk account and by using the above graph embedding solution based on the account medium network graph. While the descriptions herein use determining a junk account as an example to illustrate the implementations of the specification, the scope of the specification is not limited by this specific example. The techniques of the specification are used to determine or identify other target accounts or medium with concerned characteristics or features. For different types of target nodes, the graph structure model may be trained by different types or categories of feature data and the risk labelling data of a node. The risk labelling data indicates that a possibility of the node being a target node or that the account or medium represented by the node is a target account or a target medium.

BRIEF DESCRIPTION OF THE SEVERAL VIEWS OF THE DRAWINGS

To describe the technical solutions in the implementations of the present specification or in the existing technology more clearly, the following outlines the accompanying drawings for illustrating such technical solutions. Clearly, the accompanying drawings outlined below are some implementations of the present specification and a person skilled in the art can derive other drawings from such accompanying drawings without creative efforts.

DETAILED DESCRIPTION

Implementations of the present specification provide graph structure model training and junk account identification methods, apparatuses, and devices.

To enable a person skilled in the art to better understand technical solutions in the present specification, the following clearly and completely describes the technical solutions in the implementations of the present specification with reference to accompanying drawings in the implementations of the present specification. Clearly, the described implementations are merely some rather than all of the implementations of the present application. Based on the implementations of the present specification, all other implementations obtained by a person of ordinary skill in the art without creative efforts shall fall in the protection scope of the present application.

In general, accounts involving abnormal behavior can be considered junk accounts, such as a large quantity of accounts that are automatically registered by a machine, etc. In the risk control systems of most service platforms, identifying a junk account is essential to risk control security, and the difficulty is that the newly registered account does not have enough account portrait information to determine whether the account is a junk account. Considering the two features of a junk account, that is, media aggregation and time aggregation, the present specification provides a junk account identification scheme based on supervised graph embedding, which can effectively identify a junk account. Here, graph embedding means that some original data of the nodes in the graph is mapped in a specified feature space (referred to as a hidden feature space in the present specification) to obtain a corresponding embedded vector for representing the nodes.

Medium aggregation means that a plurality of junk accounts registered by the same malicious user are often registered by using the same medium or a few media. The reason for media aggregation is that, malicious users usually intend to pursue their gains, and do not have sufficient resources to register a large number of accounts through a large number of media.

Time aggregation means that the junk accounts controlled by the same malicious user usually perform a large quantity of abnormal behaviors within a certain short period of time. The reason for time aggregation is that malicious users tend to pursue short-term interest goals, and therefore the accounts under their control must perform a large quantity of abnormal behaviors in a short time.

Figure 1:
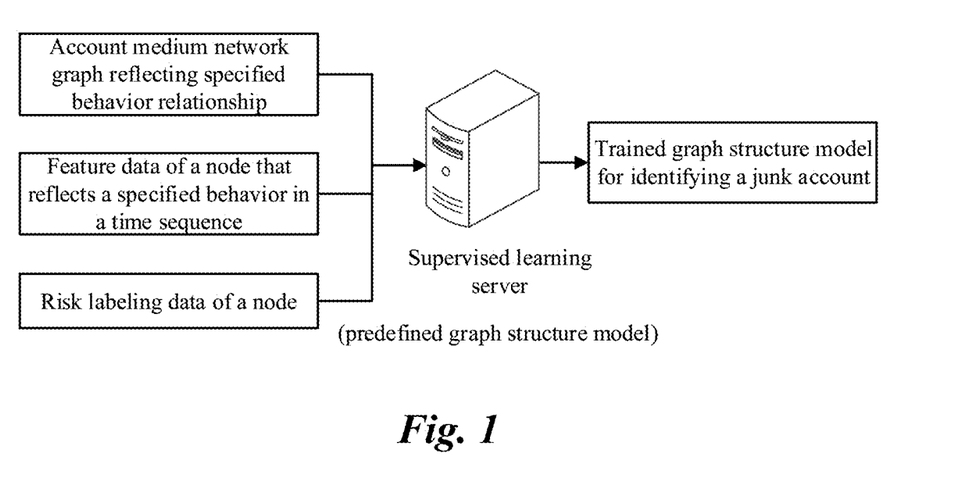
FIG. 1 is a schematic diagram illustrating an overall architecture involved in an actual application scenario of solutions of the present specification.

FIG. 1 is a schematic diagram illustrating an overall architecture involved in an actual application scenario of solutions of the present specification. The overall architecture mainly involves a supervised learning server including the predefined graph structure model, and three types of data that can be used to train the graph structure model: an account medium network graph that reflects a specified behavior relationship, feature data of a node in the account medium network graph that reflects a specified behavior in a time sequence, and risk labeling data of the node. The specified behavior is, for example, a login behavior, a registration behavior, a transaction behavior, etc. The trained graph structure model can be used to identify a junk account.

The training data can be generated by a supervised learning server or other devices, or can be written manually.

The following describes in detail the solutions of the present specification based on the example structure shown in FIG. 1.

Figure 2:
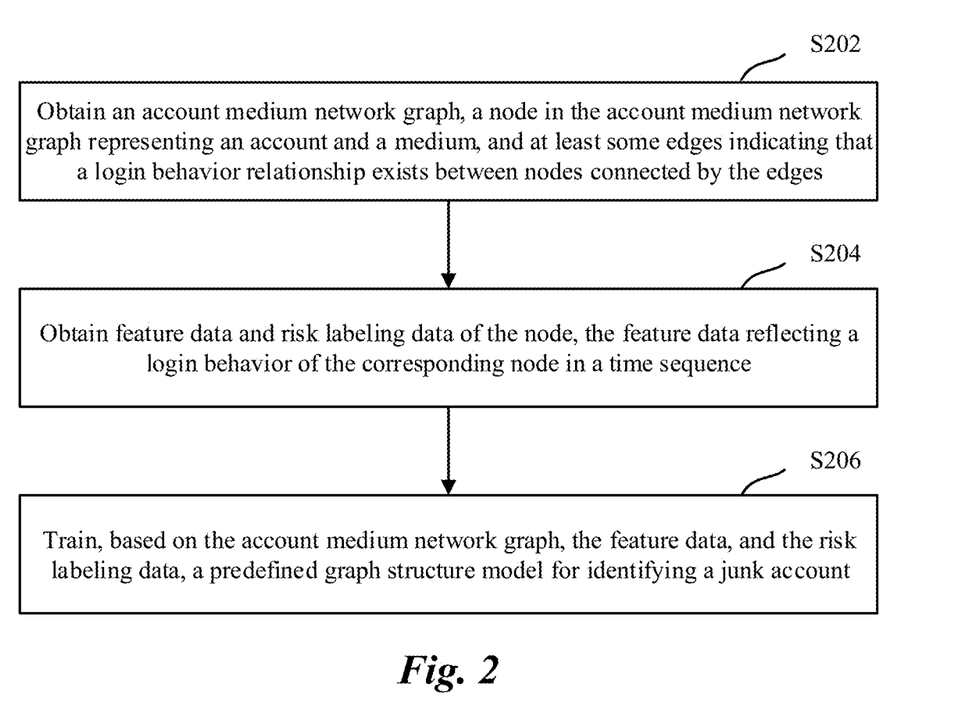
FIG. 2 is a schematic flowchart illustrating a graph structure model training method, according to an implementation of the present specification.

FIG. 2 is a schematic flowchart illustrating a graph structure model training method, according to an implementation of the present specification. The process in FIG. 2 includes following steps.

S202: Obtain an account medium network graph, a node in the account medium network graph representing an account and a medium, and at least some edges indicating that a login behavior relationship exists between nodes connected by the edges.

In this implementation of the present specification, the account medium network graph is a heterogeneous network graph. Being heterogeneous means differences in node properties; for example, some nodes in the diagram can represent accounts and some nodes can represent account-related media. The account is registered or subsequent behaviors are performed through a medium, where the medium is, for example, a device, an IP network, a physical address, etc.

In this implementation of the present specification, the account medium network graph can be generated based on historical data generated by the account over a certain period of time. The historical data can include registration behavior data of the account, such as a medium used for registering the account and registration information entered for registering the account. The historical data can also include behavior data after the account is registered, such as login behavior data and transaction behavior data of the account. The certain period of time is not specified here, and can be predetermined, for example, to be the last several days.

For newly registered accounts, for example, an account medium network graph can be generated based on account registration behavior data, and/or specified behavior data within a certain period of time (typically a certain short period of time) after registration, to identity a junk account as early as possible.

For ease of description, the following implementations are mainly described based on an example in which a medium is a device, the specified behavior is a login behavior, and the account medium network graph is specifically an account-device network graph.

During generation of the account-device network graph, each account to be represented and each device to be represented can be determined first. Each account to be represented is represented by one node, and each device can also be represented by one node; that is, each node represents an account or a device. Further, if there is a login relationship between the two nodes, an edge representing the login behavior relationship is established between the two nodes, so that an account-device network graph is generated.

Here, the login behavior relationship mainly refers to a relationship between an account and a device. If an account has been used for logging in through a certain device within a certain period of time, it can be considered that there is a login behavior relationship between the account and the device. It is worthwhile to note that, in practice, the specific meaning of the login behavior relationship can also be widened as needed. For example, the login behavior relationship can also include a relationship between accounts. If two accounts have been logging in through the same device within a certain period of time, it can be considered that there is a login behavior relationship between the two accounts.

In this implementation, the account medium network graph can be an undirected diagram or a directed diagram, which is not specifically limited here. Generally, if only the login behavior relationship is reflected, an undirected graph is used. If more relationships such as a transaction behavior relationship are also reflected, a directed graph can be used. In the directed graph, a direction of an edge indicates a business relationship direction. For example, if node A represents a buyer's account and node B represents a seller's account, an edge indicating a transaction behavior relationship between node A and node B can designate a node B from a node A, and the direction can also reflect a capital flow direction.

In this implementation of the present specification, for ease of graph calculation, the account medium network graph can be represented by a matrix. Different single rows and single columns of the matrix can be used to represent different nodes in the account medium network graph, and different elements in the matrix can represent login behavior relationships between nodes represented by the rows and columns in which the elements are located.

For example, for a matrix representing an account-device network graph, a matrix is denoted as $G \in \mathbb{R}^{n,n}$, and the matrix includes n rows and n columns, where n indicates the quantity of accounts/devices. Assuming that the account-device network graph is a bigraph, then an edge may exist only between a node indicating an account and a node indicating a device. If there is an edge, the corresponding element is 1; otherwise, the corresponding element is 0. For example, if there is an edge between a node indicating an account i and a node indicating a device j, the element in the $i^{th}$ row and the $j^{th}$ column of G is 1, that is, $g_{i,j}=1$.

S204: Obtain feature data and risk labeling data of the node, the feature data reflecting a login behavior of the corresponding node in a time sequence.

In this implementation of the present specification, the nodes involved in step S204 can be some of the nodes in the account medium network graph, and not necessarily all of the nodes. For example, the nodes can be at least some of the nodes representing accounts. Of course, feature data of at least some of the nodes representing media can also be obtained, and the feature data of a node representing a medium does not necessarily reflect the login behavior of the corresponding node in a time sequence, which is not specifically limited here. If the medium is a device, the feature data can reflect, for example, device information such as a device type or a device manufacturer.

In this implementation of the present specification, the feature data can be generated based on historical data generated by the account over a certain period of time. With regard to the above time aggregation, during generation of the feature data, not only the login behavior of the account itself is considered, but also the relationship between the login behavior of the account and the time is considered. For example, the time can be serialized (for example, a plurality of time intervals are obtained through division, or sampling is performed at discrete time points), and the distribution of the login behavior of the account in the time sequence can be determined, for example, the specific time, the duration, and the quantity of times the login behavior occurs per unit time. The feature data can be generally represented as a vector or a matrix. Some implementations below are mainly described based on an example in which the feature data is represented as a vector.

In this implementation of the present specification, the nodes in the account-device network graph are used as an example. Some nodes can represent junk accounts, and some nodes can represent devices that have been logged into junk accounts. Specific scenarios or situations of the nodes are not determined. At least some specific scenarios or situations of the nodes need to be determined by using specific means, so that training samples with training labels can be obtained for subsequent supervised learning. Specific means are not specifically limited here, for example, means such as sampling-based accurate tracking analysis or user reporting can be used.

With some specific scenarios or situations being known, risk labeling data can be marked for some nodes in advance or in real time, and the risk labeling data can indicate a risk existing in a node, for example, whether the node represents a junk account or whether the node represents a device that has been used to logged into a junk account. In practice, the risk here is not limited to junk account related content. For example, the risk can represent that a normal account is vulnerable to an attack. The training label described above can be obtained based on the risk labeling data. In general, the risk labeling data can be directly used as a training label.

The risk labeling data can be represented in various forms, which are not specifically limited here. For example, if it is determined that a node is associated with a junk account, the risk labeling data of the node can be recorded as 1; or if it is determined that a node represents a junk account or represents a device that has been used to log into a junk account, the risk labeling data of the node can be recorded as 0.

In addition, in practice, only a node representing an account has the risk labeling data, and a node representing a medium does not have the risk labeling data.

S206: Train, based on the account medium network graph, the feature data, and the risk labeling data, a predefined graph structure model for identifying a junk account.

In this implementation of the present specification, at least some of the parameters of the graph structure model are based on the graph structure, and such parameters can be assigned values based on at least some of the account medium network graphs and/or feature data. Some of the parameters of the graph structure model need to be optimized and solved through training.

For example, in an actual application scenario, the graph structure model is used to calculate the embedded vector of the node in the hidden feature space after a plurality of iterations based on the feature data of the node and the topology corresponding to the node in the account medium network graph; further, the graph structure model is used to calculate prediction data of the node based on the embedded vector, the prediction data representing a possibility that the node corresponds to a junk account.

The prediction data can be represented in various forms, which are not specifically limited here. For example, the prediction data can be represented by a probability value, a score, or a classification identifier.

In practice, it is not necessary to calculate the prediction data for the graph structure model, and the calculated embedded vector can be output to another model for use. The present specification does not analyze this case. The following implementations are mainly described based on the above example.

In this implementation of the present specification, the trained graph structure model can be used for classification or regression to predict the risk property of the input data.

For example, the input data can be feature data corresponding to the to-be-identified account and a topology corresponding to an account medium network graph (not necessarily the account medium network graph in step S202) that contains the to-be-identified account. The prediction data can be output through calculation of the trained graph structure model, and it can be determined whether the to-be-identified account is a junk account. The to-be-identified account can be represented by a node in the account medium network graph in step S202, or can be outside the account medium network graph. In the former case, the input data has been determined, and therefore can be directly identified, while in the latter case, the input data is not determined, and the solution of the present specification can be used to determine the input data before identification.

Of course, based on the specific content of the risk labeling data, the graph structure model can be used to predict the risks of other aspects in addition to the identification of the junk account. The principles are the same, and details are omitted here for simplicity.

According to the method of FIG. 2, by using the above graph embedding scheme based on the account medium network graph, the junk account can be effectively identified based on the media aggregation and time aggregation of the junk account.

Based on the method shown in FIG. 2, an implementation of the present specification further provides some implementation solutions of the method, as well as extension solutions, which are described below.

In this implementation of the present specification, it can be seen from the above example that, for step S206, the identification of the junk account can include: obtaining feature data of a to-be-identified account, and obtaining an account medium network graph that contains the to-be-identified account; inputting the feature data of the to-be-identified account and a topology corresponding to the to-be-identified account in the account medium network graph, into the trained graph structure model for calculation; and obtaining prediction data output after the calculation is performed based on the trained graph structure model calculation, to determine whether the to-be-identified account is a junk account.

In this implementation of the present specification, it has been mentioned that the time sequence can be obtained by dividing a period of time. In this case, for step S204, the obtaining of the feature data of the node can specifically include: obtaining login behavior data of the node within a certain period of time; dividing the certain period of time to obtain a time sequence; and generating, based on a distribution of the login behavior data in the time sequence, a feature vector as the feature data of the node.

For example, assuming that a certain period of time is set to be the last m days and divided into hours, then m*24 time sequences formed by time segments can be obtained and d-dimensional feature vector $x_i$ can be generated based on the quantity of logins of account i within the time segments. The specific construction method of $x_i$ is not limited. For example, d can be equal to m*24, each element of $x_i$ can represent the quantity of logins of the account i within one time segment, and the elements of $x_i$ can be normalized.

In this implementation of the present specification, the embedded vector of the node after a $t^{th}$ iteration in the hidden feature space is calculated based on the feature data of the node, the topology corresponding to the node in the account medium network graph, and the embedded vector of the node after a $t-1^{th}$ iteration in the hidden feature space. More intuitively, based on some of the above examples, an example graph structure model is defined and trained as follows:

Initializing the parameters to be optimized and solved for the graph structure model: $W_1 \in \mathbb{R}^{d,k}$, $W_2 \in \mathbb{R}^{k,k}$, and $w \in \mathbb{R}^k$, for example, using a standard Gaussian distribution for initialization; and Performing iterative training for a predetermined quantity of times or until the training converges:

Initializing $\Phi^{(1)}$;

$$\{(\text{for } t=1 \text{ to } N\text{: //Performing } N \text{ iterative executions to calculate the embedded vector } \Phi^{(t+1)} = \sigma (XW_1 + G\Phi^{(t)}W_2);\} \quad \text{(Equation 1)};$$

$$\text{pred}_i = w^T \phi_i; \quad \text{(Equation 2)}$$

Calculating prediction data based on the embedded vector; and optimize $$\text{argmin}_{W_1, W_2, w} \sum_i L(y_i, \text{pred}_i); // \quad \text{(Equation 3)}$$

Optimizing parameters, wherein, $\Phi^{(t+1)}$ indicates an embedded vector of at least one node in the hidden feature space after a $t+1^{th}$ iteration; $\sigma$ indicates a non-linear transformation function (for example, a function such as Relu, Sigmoid, Tan h, etc.); $W_1$ and $W_2$ each indicate weight matrices; X indicates the feature data of the at least one node; G indicates a topology corresponding to the at least one node in the account medium network graph; $\text{pred}_i$ indicates the prediction data of an $i^{th}$ node that is obtained through iteration; $\phi_i$ indicates an embedded vector of the $i^{th}$ node in the hidden feature space that is obtained through the plurality of iterations; $w^T$ indicates a parameter vector that is obtained by quantitizing; $\phi_i$; T indicates a transposition operation; $y_i$ indicates the risk labeling data of the $i^{th}$ node; and L indicates a loss function for measuring a consistency difference between the prediction data and corresponding risk labeling data. The specific loss function is not limited here; for example, loss functions such as logistic loss, hinge loss, and cross entropy can be used.

In the above example, $G \in \mathbb{R}^{n,n}$, where G indicates a complete topology of the account medium network graph. In this case, X can indicate the feature data of all the nodes in the account medium network graph, and $\Phi$ can indicate the embedded vectors of all the nodes in the account medium network graph. For example, $X \in \mathbb{R}^{n,n}$, where each row of X indicates the feature data of one node; and $\Phi \in \mathbb{R}^{n,k}$, where k indicates the dimension of the embedded hidden feature space, and each row of $\Phi$ indicates the embedded vector of one node.

Of course, G can alternatively represent a part of the complete topology of the account medium network graph; and correspondingly, X and $\Phi$ can alternatively include the data of some nodes in the account medium network graph.

In this implementation of the present specification, the graph structure model can be trained to maximize a consistency between the prediction data and the corresponding risk labeling data. Then, in the scenario of the above example, for step S206, the training of the predefined graph structure model can specifically include: optimizing $$\mathrm{argmin}_{W_1, W_2, w} \sum_i L(y_i, pred_i)$$

based on a backpropagation algorithm and the risk labeling data, to obtain optimum $W_1$, $W_2$, and w.

Equation 1, Equation 2, and Equation 3 above are examples and are not the only solutions. For example, the terms in which X and G are respectively located in Equation 1 can be transformed by performing operations such as multiplication, exponent operation, or logarithm operation; or the two terms can be combined; or one of the two terms can be deleted. For another example, in Equation 2, the function softmax can be used to quantitize $\phi_i$. For still another example, if the loss function in Equation 3 represents the consistency between the prediction data and the corresponding risk prediction data, a maximum value can be calculated in Equation 3.

Figure 3:
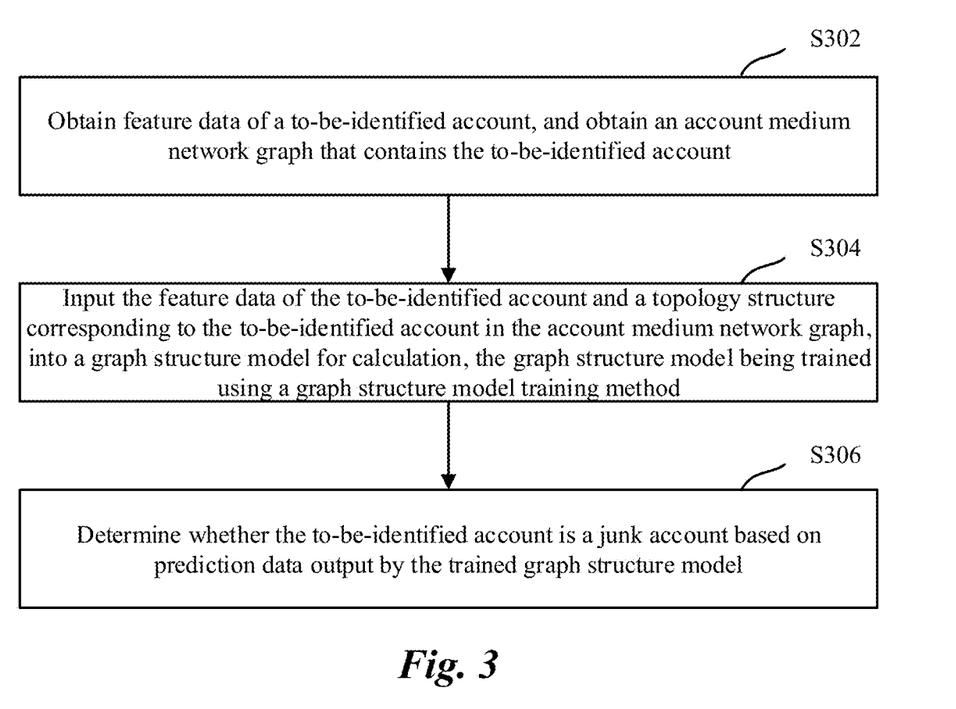
FIG. 3 is a schematic flowchart illustrating a junk account identification method, according to an implementation of the present specification.

An implementation of the present specification further provides a schematic flowchart illustrating a junk account identification method based on the above graph structure model, as shown in FIG. 3. The process in FIG. 3 includes the following steps.

S302: Obtain feature data of a to-be-identified account, and obtain an account medium network graph that contains the to-be-identified account.

S304: Input the feature data of the to-be-identified account and a topology corresponding to the to-be-identified account in the account medium network graph, into a graph structure model for calculation, the graph structure model being trained using the above graph structure model training method.

S306: Determine whether the to-be-identified account is a junk account based on prediction data output by the trained graph structure model.

Figure 4:
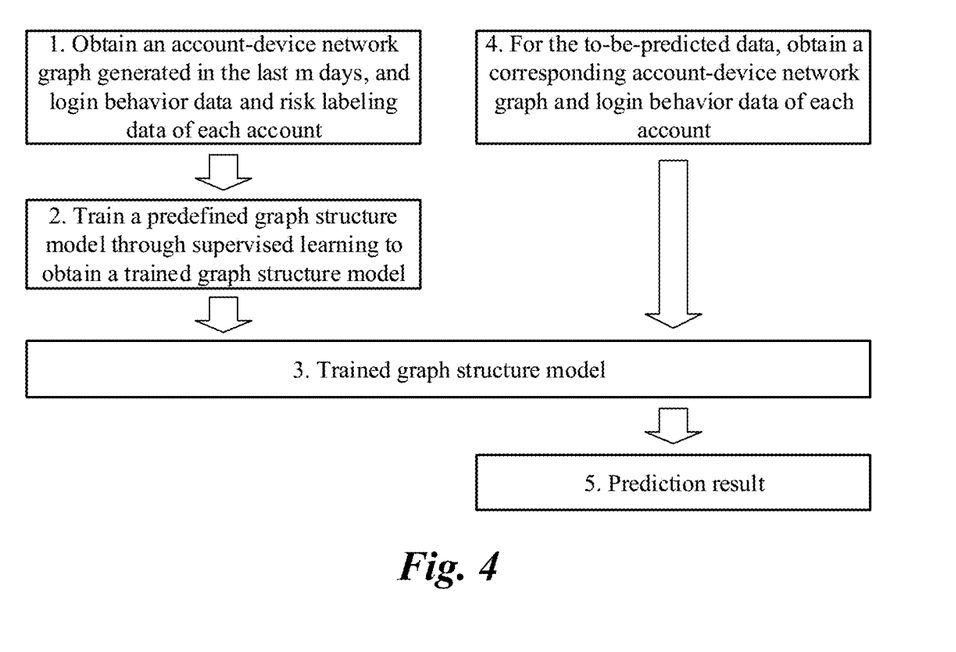
FIG. 4 is a schematic diagram illustrating an implementation solution of the above methods, according to an implementation of the present specification.

Based on the above description, an implementation of the present specification further provides a schematic diagram illustrating an implementation solution of the above methods, as shown in FIG. 4.

The solution of FIG. 4 can include the following steps: obtaining an account-device network graph generated in the last m days, and login behavior data and risk labeling data of each account; training a predefined graph structure model through supervised learning to obtain a trained graph structure model; for the to-be-predicted data (for example, one or more accounts), obtaining a corresponding account-device network graph and login behavior data of each account; and performing prediction by using the trained graph structure model to obtain a prediction result.

The methods provided in the present specification have been described above. Based on the same idea, implementations of the present specification further provide a corresponding apparatus and device, as shown in FIG. 5 to FIG. 8.

Figure 5:
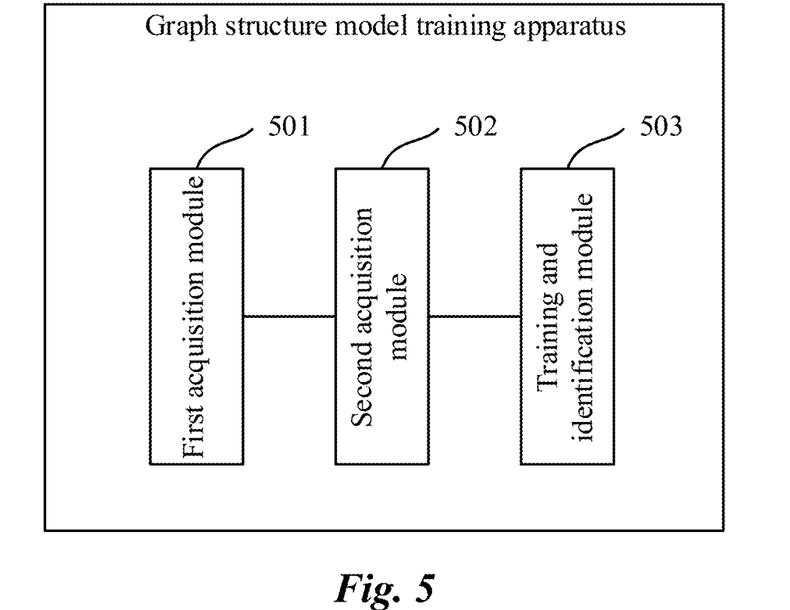
FIG. 5 is a schematic structural diagram illustrating a graph structure model training apparatus corresponding to FIG. 2, according to an implementation of the present specification.

FIG. 5 is a schematic structural diagram illustrating a graph structure model training apparatus corresponding to FIG. 2, according to an implementation of the present specification. The apparatus can be located in an execution body of the process in FIG. 2. The apparatus includes: a first acquisition module 501, configured to obtain an account medium network graph, a node in the account medium network graph representing an account and a medium, and at least some edges indicating that a login behavior relationship exists between nodes connected by the edges; a second acquisition module 502, configured to obtain feature data and risk labeling data of the node, the feature data reflecting a login behavior of the corresponding node in a time sequence; and a training and identification module 503, configured to train, based on the account medium network graph, the feature data, and the risk labeling data, a predefined graph structure model for identifying a junk account.

Optionally, the media includes a device.

Optionally, the graph structure model is used to calculate an embedded vector of the node after a plurality of iterations in a hidden feature space based on the feature data of the node and a topology corresponding to the node in the account medium network graph.

Optionally, the graph structure model is further used to calculate prediction data of the node based on the embedded vector, the prediction data representing a possibility that the node corresponds to a junk account.

Optionally, that the training identification module 503 identifies a junk account specifically includes: obtaining, by the training identification module 503, a to-be-identified account, and obtaining an account medium network graph that contains the to-be-identified account; inputting the feature data of the to-be-identified account and a topology corresponding to the to-be-identified account in the account medium network graph, into the trained graph structure model for calculation; and obtaining prediction data output after the calculation is performed based on the trained graph structure model calculation, to determine whether the to-be-identified account is a junk account.

Optionally, that the second acquisition module 502 obtains feature data of the node specifically includes: obtaining, by the second acquisition module 502, login behavior data of the node within a certain period of time; dividing the certain period of time to obtain a time sequence; and generating, based on a distribution of the login behavior data in the time sequence, a feature vector as the feature data of the node.

Optionally, the embedded vector of the node after a $t^{th}$ iteration in the hidden feature space is calculated based on the feature data of the node, the topology corresponding to the node in the account medium network graph, and the embedded vector of the node after a $t-1^{th}$ iteration in the hidden feature space.

Optionally, the calculating the embedded vector of the node after the plurality of iterations in the hidden feature space based on the feature data of the node and the topology corresponding to the node in the account medium network graph specifically includes calculating the embedded vector of the node after the plurality of iterations in the hidden feature space based on the following equation:

$$\Phi^{(t+1)} = \sigma(XW_1 + G\Phi^{(t)}W_2).$$

$\Phi^{(t+1)}$ indicates an embedded vector of at least one node in the hidden feature space after a $t+1^{th}$ iteration; $\sigma$ indicates a non-linear transformation function; $W_1$ and $W_2$ each indicate weight matrices; X indicates the feature data of the at least one node; and G indicates a topology corresponding to the at least one node in the account medium network graph.

Optionally, the calculating the prediction data of the node based on the embedded vector includes calculating the prediction data of the node based on the following equation:

$$\text{pred}_i = w^T \phi_i.$$

$\text{pred}_i$ indicates the prediction data of an $i^{th}$ node that is obtained through iteration; $\phi_i$ indicates an embedded vector of the $i^{th}$ node in the hidden feature space that is obtained through the plurality of iterations; i indicates a parameter vector that is obtained by quantitizing $\phi_i$; and T indicates a transposition operation.

Optionally, that the training and identification module 503 trains a predefined graph structure model specifically includes: training, by the training and identification module 503, the predefined graph structure model to maximize a consistency between the prediction data and the corresponding risk labeling data.

Optionally, that the training and identification module 503 trains a predefined graph structure model specifically includes: optimizing, by the training and identification module 503, $$\operatorname{argmin}_{W_1, W_2, w} \sum_i L(y_i, \text{pred}_i)$$

based on a backpropagation algorithm and the risk labeling data, to obtain optimum $W_1$, $W_2$, and w. $y_i$ indicates the risk labeling data of the $i^{th}$ node; and L indicates a loss function for measuring a consistency difference between the prediction data and corresponding risk labeling data.

While the descriptions herein use determining a junk account as an example to illustrate the implementations of the specification, the scope of the specification is not limited by this specific example. The techniques of the specification are used to determine or identify other target accounts or medium with concerned characteristics or features. For different types of target nodes, the graph structure model may be trained by different types or categories of feature data and the risk labelling data of a node. The risk labelling data indicates that a possibility of the node being a target node or that the account or medium represented by the node is a target account or a target medium.

Figure 6:
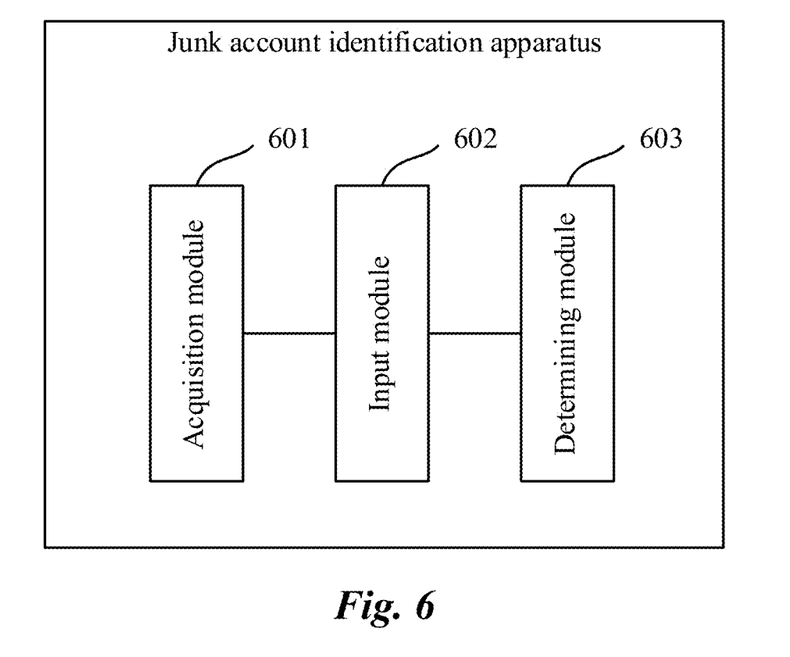
FIG. 6 is a schematic structural diagram illustrating a junk account identification apparatus corresponding to FIG. 3, according to an implementation of the present specification.

FIG. 6 is a schematic structural diagram illustrating a junk account identification apparatus corresponding to FIG. 3, according to an implementation of the present specification. The apparatus can be located in an execution body of the process in FIG. 3. The apparatus includes: an acquisition module 601, configured to obtain feature data of a to-be-identified account, and obtain an account medium network graph that contains the to-be-identified account; an input module 602, configured to input the feature data of the to-be-identified account and a topology corresponding to the to-be-identified account in the account medium network graph, into a graph structure model for calculation, the graph structure model being trained using the above graph structure model training method; and a determining module 603, configured to determine whether the to-be-identified account is a junk account based on prediction data output by the trained graph structure model.

Figure 7:
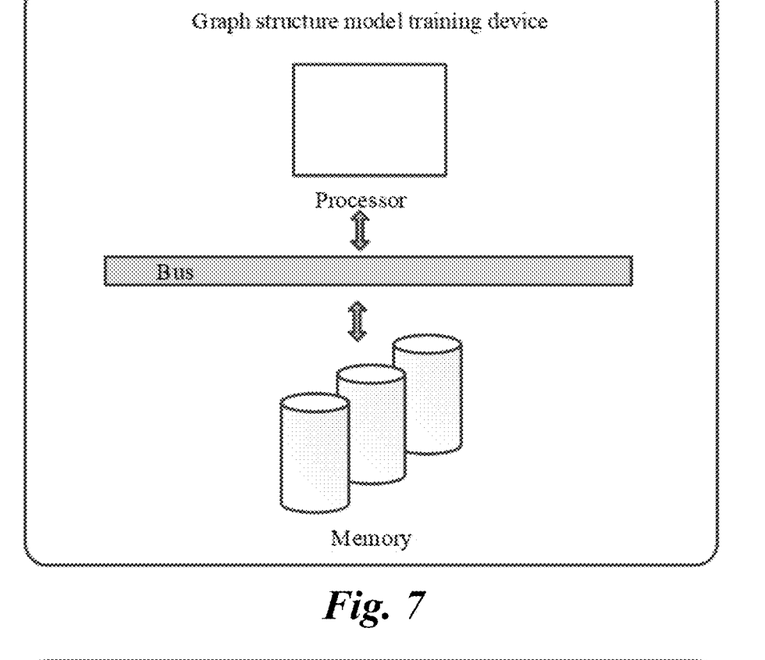
FIG. 7 is a schematic structural diagram illustrating a graph structure model training device corresponding to FIG. 2, according to an implementation of the present specification.

FIG. 7 is a schematic structural diagram illustrating a graph structure model training device corresponding to FIG. 2, according to an implementation of the present specification. The device includes at least one processor, and a memory communicatively connected to the at least one processor. The memory stores instructions that can be executed by the at least one processor, and the instructions are executed by the at least one processor to enable the at least one processor to: obtain an account medium network graph, a node in the account medium network graph representing an account and a medium, and at least some edges indicating that a login behavior relationship exists between nodes connected by the edges; obtain feature data and risk labeling data of the node, the feature data reflecting a login behavior of the corresponding node in a time sequence; and train, based on the account medium network graph, the feature data, and the risk labeling data, a predefined graph structure model for identifying a junk account.

Figure 8:
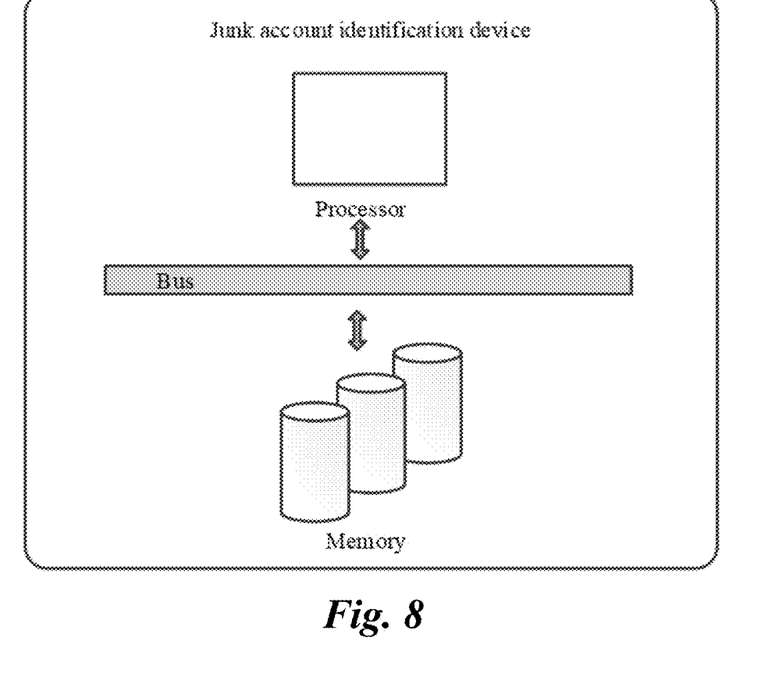
FIG. 8 is a schematic structural diagram illustrating a junk account identification device corresponding to FIG. 3, according to an implementation of the present specification.

FIG. 8 is a schematic structural diagram illustrating a junk account identification device corresponding to FIG. 3, according to an implementation of the present specification. The device includes at least one processor, and a memory communicatively connected to the at least one processor. The memory stores instructions that can be executed by the at least one processor, and the instructions are executed by the at least one processor to enable the at least one processor to: obtain feature data of a to-be-identified account, and obtain an account medium network graph that contains the to-be-identified account; input the feature data of the to-be-identified account and a topology corresponding to the to-be-identified account in the account medium network graph, into a graph structure model for calculation, the graph structure model being trained using the above graph structure model training method; and determine whether the to-be-identified account is a junk account based on prediction data output by the trained graph structure model.

Based on the same idea, an implementation of the present specification further provides a non-volatile computer storage medium corresponding to FIG. 2. The storage medium stores computer-executable instructions, and the computer-executable instructions are used to: obtain an account medium network graph, a node in the account medium network graph representing an account and a medium, and at least some edges indicating that a login behavior relationship exists between nodes connected by the edges; obtain feature data and risk labeling data of the node, the feature data reflecting a login behavior of the corresponding node in a time sequence; and train, based on the account medium network graph, the feature data, and the risk labeling data, a predefined graph structure model for identifying a junk account.

Based on the same idea, an implementation of the present specification further provides a non-volatile computer storage medium corresponding to FIG. 3. The storage medium stores computer-executable instructions, and the computer-executable instructions are used to: obtain feature data of a to-be-identified account, and obtain an account medium network graph that contains the to-be-identified account; input the feature data of the to-be-identified account and a topology corresponding to the to-be-identified account in the account medium network graph, into a graph structure model for calculation, the graph structure model being trained using the above graph structure model training method; and determine whether the to-be-identified account is a junk account based on prediction data output by the trained graph structure model.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The implementations of the present specification are described in a progressive way. For same or similar parts of the implementations, mutual references can be made to the implementations. Each implementation focuses on a difference from the other implementations. In particular, for implementations of an apparatus, a device, and a non-volatile computer storage medium, because implementations of an apparatus, a device, and a non-volatile computer storage medium are basically similar to method implementation, description is relatively simple, and references can be made to partial descriptions of the method implementation.

The apparatus, device, and non-volatile computer storage medium provided in the implementations of the present specification correspond to the method. Therefore, the apparatus, device, and non-volatile computer storage medium also have beneficial technical effects that are similar to those of corresponding method. Because the beneficial technical effects of the method have been described in detail above, the beneficial technical effects of the corresponding apparatus, device, and non-volatile computer storage medium details are omitted here for simplicity.

In the 1990s, whether technology improvement is hardware improvement (for example, improvement of a circuit structure, such as a diode, a transistor, or a switch) or software improvement (improvement of a method procedure) can be clearly distinguished. However, as technologies develop, the current improvement for many method procedures can be considered a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered a hardware component, and a device configured to implement various functions in the controller can also be considered a structure in the hardware component. Alternatively, the device configured to implement various functions can even be considered both a software module implementing the method and a structure in the hardware component.

The system, device, module, or unit illustrated in the previous implementations can be implemented by using a computer chip or an entity, or can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above devices are described separately in terms of their functions. Certainly, functions of the units can be implemented in the same or different software or hardware when the present specification is implemented.

A person skilled in the art should understand that the implementations of the present specification can be provided as methods, systems, or computer program products. Therefore, the implementations of the present specification can take a form of complete hardware implementations, complete software implementations, or implementations combining software and hardware aspects. Further, the implementations of the present specification can take a form of a computer program product implemented on one or more computer-usable storage media (including but not limited to disk storage, CD-ROM, and optical storage) containing computer-usable program code.

The present specification is described with reference to at least one of a flowchart or block diagram of the method, device (system), and computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM), The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium, The computer storage medium can be used to store information accessible by a computing device. Based on the definition in the present specification, the computer readable medium does not include transitory media such as a modulated data signal and carrier.

It is also worthwhile to note that terms "include", "comprise", or any other variant thereof is intended to cover non-exclusive inclusion, so that processes, methods, commodities or devices that include a series of elements include not only those elements but also other elements that are not explicitly listed, or elements inherent in such processes, methods, commodities or devices. An element described by "includes a . . . " further includes, without more constraints, another identical element in the process, method, product, or device that includes the element.

A person skilled in the art should understand that the implementations of the present specification can be provided as methods, systems or computer program products. Therefore, the present specification can take a form of complete hardware implementations, complete software implementations, or implementations combining software and hardware. Further, the present specification can take a form of a computer program product implemented on one or more computer-usable storage media (including but not limited to disk storage, CD-ROM, and optical storage) containing computer-usable program code.

The present specification can be described in the general context of computer executable instructions executed by a computer, for example, a program module. Generally, the program module includes a routine, a program, an object, a component, a data structure, etc., executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

The above descriptions are merely examples of the present specification and are not intended to limit the present application. For a person skilled in the art, the present application can be subject to various modifications and variations. Any modification, equivalent replacement or improvement made within spirit and principles of the present application shall be included in claims of the present application.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   obtaining an account medium network including a plurality of nodes and at least one edge, at least one node of the plurality of nodes representing an account, at least one node of the plurality of nodes representing a medium, an edge of the at least one edge indicating a login behavior relationship between nodes of the plurality of nodes connected by the edge;
   obtaining a feature data and a risk labeling data of a node of the plurality of nodes, the feature data reflecting a login behavior of the node in a period of time, the risk labeling data indicating a first possibility of the node being a target node;
   training a graph structure model based on the account medium network, the feature data, and the risk labeling data; and
   estimating a second possibility of the node being a target node by calculating an embedded vector of the node in a hidden features space using the graph structure model and based on the feature data of the node and a graph topology corresponding to the node in the account medium network, wherein the calculating the embedded vector of the node in the hidden feature space includes a plurality of iterations, the embedded vector of the node in the hidden feature space after a $t^{th}$ iteration being calculated based on the feature data of the node, the graph topology and the embedded vector of the node in the hidden features space after a $(t-1)^{th}$ iteration of the plurality of iterations.

2. The method according to claim 1, wherein the medium comprises a device.

3. The method according to claim 1, wherein the calculating the embedded vector of the node in the hidden feature space comprises:
   calculating the embedded vector of the node in the hidden feature space with the plurality of iterations based on an equation:

$$\Phi^{(t+1)} = \sigma(XW_1 + G\Phi^{(t)}W_2);$$

wherein:
   $\Phi^{(t+1)}$ indicates the embedded vector of the node in the hidden feature space after a $(t+1)^{th}$ iteration of the plurality of iterations;
   $\sigma$ indicates a non-linear transformation function;
   $W_1$ and $W_2$ each indicate weight matrices;
   X indicates the feature data of the node; and
   G indicates the graph topology corresponding to the node in the account medium network.

4. The method according to claim 3, comprising calculating a prediction data indicating the second possibility of the node being a target node based on an equation:

$$pred_i = w^T \phi_i$$

wherein:
   $pred_i$ indicates the prediction data of the node;
   $\phi_i$ indicates the embedded vector of the node in the hidden feature space;
   $w^T$ indicates a parameter vector that is obtained by quantitizing $\phi_i$; and
   T indicates a transposition operation.

5. The method according to claim 4, wherein the training the graph structure model comprises:
   training the graph structure model to improve a consistency between the prediction data and the risk labeling data of the node.

6. The method according to claim 4, wherein the training the graph structure model comprises:

$$\text{optimizing argmin}_{W_1, W_2, w} \sum_i L(y_i, pred_i)$$

based on a backpropagation algorithm and the risk labeling data of the node to obtain $W_1$, $W_2$, and w,
   wherein:
   $y_i$ indicates the risk labeling data of the node; and
   L indicates a loss function for measuring an inconsistency between the prediction data and the risk labeling data.

7. The method according to claim 1, wherein the obtaining the feature data of the node comprises:
   obtaining a login behavior data of the node within the period of time;
   dividing the period of time to obtain a time sequence; and
   generating, based on a distribution of the login behavior data in the time sequence, a feature vector as the feature data of the node.

8. The method according to claim 1, comprising:
   obtaining a feature data of a to-be-identified account;
   obtaining the account medium network that contains the to-be-identified account as a first node;
   inputting the feature data of the to-be-identified account and a graph topology corresponding to the first node in the account medium network into the graph structure model for calculation of a first prediction data of the first node; and
   determining whether the to-be-identified account is a target account based on the first prediction data.

9. An apparatus, comprising:
   a first acquisition module, configured to obtain an account medium network including a plurality of nodes and at least one edge, at least one node of the plurality of nodes representing an account, at least one node of the plurality of nodes representing a medium, an edge of the at least one edge indicating a login behavior relationship between nodes of the plurality of nodes connected by the edge;
   a second acquisition module, configured to obtain a feature data and a risk labeling data of a node of the plurality of nodes, the feature data reflecting a login behavior of the node in a period of time, the risk labeling data indicating a first possibility of the node being a target node; and
   a training and identification module, configured to train a graph structure model based on the account medium network, the feature data, and the risk labeling data,
   wherein the training the graph structure model includes:
   estimating a second possibility of the node being a target node by calculating an embedded vector of the node in a hidden feature space using the graph structure model and based on the feature data of the node and a graph topology corresponding to the node in the account medium network; and
   the calculating the embedded vector of the node in the hidden feature space including a plurality of iterations, the embedded vector of the node in the hidden feature space after a $t^{th}$ iteration being calculated based on the feature data of the node, the graph topology and the embedded vector of the node in the hidden feature space after a $(t-1)^{th}$ iteration of the plurality of iterations.

10. The apparatus according to claim 9, wherein the medium comprises a device.

11. The apparatus according to claim 9, wherein the training and identification module calculates the embedded vector of the node in the hidden feature space based on an equation:

$$\Phi^{(t+1)}=\sigma(XW_1+G\Phi^{(t)}W_2);$$

wherein:
$\Phi^{(t+1)}$ indicates the embedded vector of the node in the hidden feature space after a $(t+1)^{th}$ iteration of the plurality of iterations;
σ indicates a non-linear transformation function;
$W_1$ and $W_2$ each indicate weight matrices;
X indicates the feature data of the node; and
G indicates the graph topology corresponding to the node in the account medium network.

12. The apparatus according to claim 11, wherein the training and identification module calculates a prediction data indicating the second possibility of the node being a target node based on an equation:

$$\text{pred}_i = w^T \phi_i;$$

wherein:
$\text{pred}_i$ indicates the prediction data of the node;
$\phi_i$ indicates the embedded vector of the node in the hidden feature space;
$w^T$ indicates a parameter vector that is obtained by quantitizing $\phi_i$; and
T indicates a transposition operation.

13. The apparatus according to claim 12, wherein the training and identification module trains the graph structure model to improve a consistency between the prediction data and the risk labeling data of the node.

14. The apparatus according to claim 12, wherein that the training and identification module trains the graph structure model by:

$$\text{optimizing argmin}_{W_1, W_2, w} \sum_i L(y_i, \text{pred}_i)$$

based on a backpropagation algorithm and the risk labeling data of the node to obtain $W_1$, W2, and w,
wherein:
$y_i$ indicates the risk labeling data of the node; and
L indicates a loss function for measuring an inconsistency between the prediction data and the risk labeling data.

15. The apparatus according to claim 9, wherein the training and identification module calculates a prediction data of the node based on the embedded vector, the prediction data indicating the second possibility of the node being a target node.

16. The apparatus according to claim 9, wherein the second acquisition module obtains the feature data of the node by:
obtaining a login behavior data of the node within the period of time;
dividing the period of time to obtain a time sequence; and
generating, based on a distribution of the login behavior data in the time sequence, a feature vector as the feature data of the node.

17. The apparatus according to claim 9, comprising:
an acquisition module, configured to obtain a feature data of a to-be-identified account, and obtain the account medium network that contains the to-be-identified account as a first node;
an input module, configured to input the feature data of the to-be-identified account and a graph topology corresponding to the first node in the account medium network into the graph structure model for calculation of a first prediction data of the first node; and
a determining module, configured to determine whether the to-be-identified account is a target account based on the first prediction data.

18. A device, comprising:
at least one processor; and
a memory communicatively connected to the at least one processor and storing instructions that when executed by the at least one processor, configure the at least one processor to implement acts including:
obtaining an account medium network including a plurality of nodes and at least one edge, at least one node of the plurality of nodes representing an account, at least one node of the plurality of nodes representing a medium, an edge of the at least one edge indicating a login behavior relationship between nodes of the plurality of nodes connected by the edge;
obtaining a feature data and a risk labeling data of a node of the plurality of nodes, the feature data reflecting a login behavior of the node in a period of time, the risk labeling data indicating a first possibility of the node being a target node;
training a graph structure model based on the account medium network, the feature data, and the risk labeling data; and
estimating a second possibility of the node being a target node by calculating an embedded vector of the node in a hidden feature space using the graph structure model and based on the feature data of the node and a graph topology corresponding to the node in the account medium network, wherein the calculating the embedded vector of the node in the hidden feature space includes a plurality of iterations, the embedded vector of the node in the hidden feature space after a $t^{th}$ iteration being calculated based on the feature data of the node, the graph topology, and the embedded vector of the node in the hidden feature space after a $(t-1)^{th}$ iteration of the plurality of iterations.

19. The device according to claim 18, wherein the acts include:
obtaining a feature data of a to-be-identified account;
obtaining the account medium network that contains the to-be-identified account as a first node;
inputting the feature data of the to-be-identified account and a graph topology corresponding to the first node in the account medium network into the graph structure model for calculation of a first prediction data of the first node; and
determining whether the to-be-identified account is a target account based on the first prediction data.

20. The device according to claim 18, wherein the calculating the embedded vector of the node in the hidden feature space comprises:

calculating the embedded vector of the node in the hidden feature space with the plurality of iterations based on an equation:

$$\Phi^{(t+1)} = \sigma(XW_1 + G\Phi^{(t)}W_2);$$

wherein:
- $\Phi^{(t+1)}$ indicates the embedded vector of the node in the hidden feature space after a $(t+1)^{th}$ iteration of the plurality of iterations;
- $\sigma$ indicates a non-linear transformation function;
- $W_1$ and $W_2$ each indicate weight matrices;
- $X$ indicates the feature data of the node; and
- $G$ indicates the graph topology corresponding to the node in the account medium network.

21. The device according to claim 20, wherein the acts include calculating a prediction data indicating the second possibility of the node being a target node based on an equation:

$$pred_i = w^T \phi_i$$

wherein:
- $pred_i$ indicates the prediction data of the node;
- $\phi_i$ indicates the embedded vector of the node in the hidden feature space;
- $w^T$ indicates a parameter vector that is obtained by quantitizing $\phi_i$; and
- $T$ indicates a transposition operation.

22. The device according to claim 21, wherein the training the graph structure model comprises:

training the graph structure model to improve a consistency between the prediction data and the risk labeling data of the node.

23. The device according to claim 21, wherein the training the graph structure model includes:

$$\text{optimizing argmin}_{W_1, W_2, w} \sum_i L(y_i, pred_i)$$

based on a backpropagation algorithm and the risk labeling data of the node to obtain $W_1$, $W_2$, and $w$, wherein:
- $y_i$ indicates the risk labeling data of the node; and
- $L$ indicates a loss function for measuring an inconsistency between the prediction data and the risk labeling data.

24. The device according to claim 18, wherein the obtaining the feature data of the node comprises:

obtaining a login behavior data of the node within the period of time;

dividing the period of time to obtain a time sequence; and generating, based on a distribution of the login behavior data in the time sequence, a feature vector as the feature data of the node.

* * * * *